Figure 1:
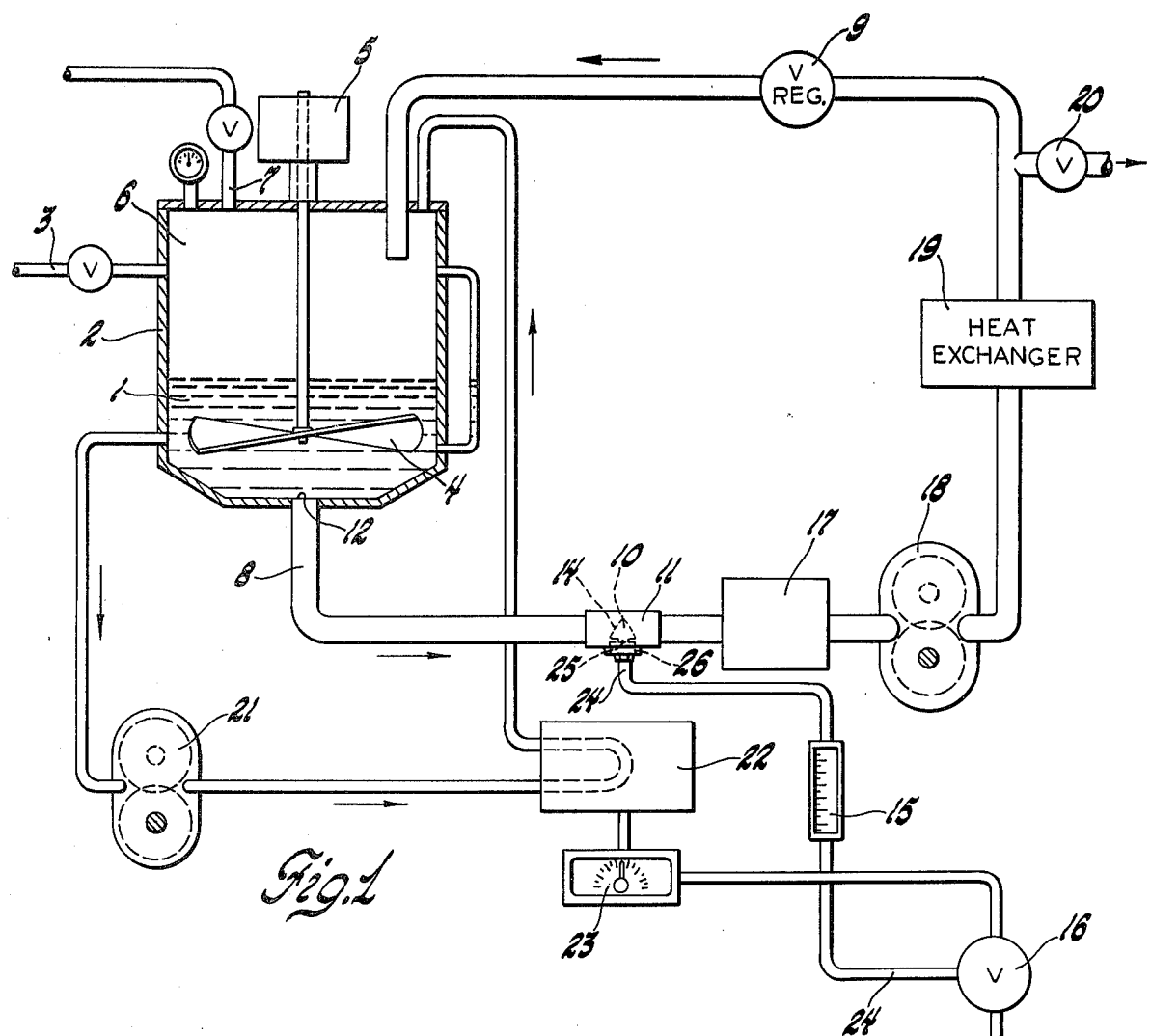

United States Patent [19]
Ferber

[11] 4,157,427
[45] Jun. 5, 1979

[54] METHOD FOR ENTRAINING GAS IN A LIQUID CHEMICAL PRECURSOR FOR REACTION INJECTION MOLDING

[75] Inventor: George Ferber, Sterling Heights, Mich.

[73] Assignee: General Motors Corporation, Detroit, Mich.

[21] Appl. No.: 840,904

[22] Filed: Oct. 11, 1977

[51] Int. Cl.² .............................................. C08J 9/30
[52] U.S. Cl. .................................... 521/133; 422/131; 422/133; 422/135; 521/917
[58] Field of Search .................. 260/2.5 BC, 2.5 BD; 521/917, 133

[56] References Cited

U.S. PATENT DOCUMENTS

| | | | |
|---|---|---|---|
| 3,063,952 | 11/1962 | Villi | 260/2.5 F |
| 3,096,001 | 7/1963 | Boe et al. | 260/2.5 BD |
| 3,170,972 | 2/1965 | Knipp et al. | 260/2.5 BD |
| 3,188,296 | 6/1965 | Hoppe et al. | 260/2.5 BD |
| 3,488,300 | 1/1970 | Burkholder | 260/2.5 BD |
| 3,769,232 | 10/1973 | Houldridge | 260/2.5 BC |
| 3,796,779 | 3/1974 | Greenberg | 264/50 |
| 3,882,052 | 5/1975 | Raynor et al. | 260/2.5 BD |

*Primary Examiner*—Morton Foelak
*Attorney, Agent, or Firm*—George A. Grove

[57] ABSTRACT

In a preferred embodiment, minute bubbles of a suitable gas are rapidly entrained in a liquid chemical constituent of a reaction injection molding system (e.g., polyurethane) to reduce the viscosity of the constituent and the density of parts molded therefrom. A small portion of the constituent is continuously withdrawn from and returned to a main holding tank via a recirculation line wherein minute gas bubbles are dispersed from a microporous stone into the flowing portion of the constituent. The recirculating and gas entraining processes are continued until a predetermined quantity of the gas is dispersed in the molding constituent.

4 Claims, 2 Drawing Figures

U.S. Patent

Jun. 5, 1979

4,157,427

METHOD FOR ENTRAINING GAS IN A LIQUID CHEMICAL PRECURSOR FOR REACTION INJECTION MOLDING

This invention relates to a method of rapidly dispersing a predetermined quantity of minute bubbles into a supply of a liquid chemical constituent of a reaction injection molding system. More particularly, this invention relates to aerating the liquid isocyanate and/or polyol constituents of a typical polyurethane reaction injection molding (RIM) system with minute bubbles of a suitable gas to promote the rapid molding of microcellular polyurethane articles.

RIM pertains generally to high pressure impingement mixing of two or more highly chemically reactive liquid constituents and injection of the mixture into heated molds to form thermoset plastic articles. RIM is particularly useful in forming polyurethane articles such as resilient automobile fascia. Such molded articles are desirable because they are flexible under impact conditions, can be readily painted, and are not subject to corrosion experienced by metals.

Generally, RIM systems are foamed to save material, facilitate the molding process, and impart good physical properties to molded articles. It is a common practice to mix a heat activated blowing agent, typically a fluorinated hydrocarbon such as Freon ®, with at least one of the liquid constituents. The blowing agent is chosen to first vaporize or decompose at elevated temperatures reached by the materials after they are injected into the mold in order to foam the constituents and fill out the mold. However, with fast reacting RIM systems, the constituents tend to set up before a blowing agent can be activated. Thus, even though such "fast" RIM systems are desirable to cut molding cycle times, they have heretofore been impractical either because of excessive material usage or poor mold fill out. Moreover, it appears that the use of some foaming agents, e.g., the fluorinated hydrocarbons, may be banned or regulated in the future.

The foaming of RIM systems is sometimes assisted by whipping a suitable gas into a constituent-blowing agent mixture held in a tank equipped with a suitable agitator. Entraining gas bubbles in this manner in such a mixture lowers its viscosity, facilitating impingement mixing before molding. There is also evidence that when the blowing agent is activated, the gas released thereby accumulates in the bubbles already present from the whipping operation, promoting a uniform cellular structure in a cured article. However, it usually takes at least several hours to disperse a desired amount of gas into a bulk tank holding 50 gallons or more of such a constituent mixture by such whipping procedures. This obviously leads to costly production delays. Moreover, tank agitation cannot be practically used to introduce enough gas into a liquid constituent of a RIM system without the concurrent use of a heat activated blowing agent.

It is therefore an object of the invention to provide an improved method of introducing a gaseous foaming agent into liquid constituents of reaction injection molding systems. It is a more specific object to disperse the gas into a constituent in the form of minute bubbles to reduce its viscosity and provide an article molded from the constituent with a microcellular structure. It is a further object of the invention to provide a novel method of entraining sufficient quantities of minute gas bubbles into RIM constituents to obviate the need for supplemental heat activated liquid chemical blowing agents. It is a further object of the invention to add such desired quantities of gaseous blowing agents into supplies of liquid RIM constituents in a very short time.

In accordance with a preferred practice of my invention, these and other objects are accomplished as follows. A measured quantity of a RIM constituent is delivered to a tank equipped with an agitator and blanketed with a gas that is nonreactive with the constituent. A small portion of the constituent is continuously withdrawn from the tank though a recirculation line and returned to the tank. A microporous diffuser stone is located at a suitable location in the line and is sized so that the constituent in the line can flow around it. The stone is in communication with a pressurized source of a suitable gas such as nitrogen, carbon dioxide or dry air. A measured quantity of the gas is forced through the diffuser stone under pressure into the flowing liquid stream, thereby dispersing thousands of minute bubbles of the gas from the surface of the stone into the constituent. A stationary multi-blade mixing device is located in the line downstream from the diffuser stone. The blades of the mixer are arranged to provide a tortuous path for the flowing constituent and as the bubbles collide with the blades they are divided into even smaller bubbles. Although the bubbles diffused though the stone are small enough to produce a finished article with a smooth surface and fine microcellular structure, use of a stationary blade or other such mixer refines the microcellular structure of a molded article even further. The portion of the constituent containing the entrained gas bubbles is returned to the tank and mixed in with the main portion of the constituent in the tank. The gas entraining process is continued until a desired quantity of the gas is dispersed into the constituent. Known sampling and control means can be employed to automatically regulate the amount of gas entrained by my method.

When sufficient gas has been entrained, the constituent is delivered to a mixing head, mixed at high pressure with the other constituents and injected into a suitable mold. The entrained gas expands due to the reduced pressure in the mold, filling it out and forming a microcellular article having a high quality paintable surface. Enough gas can be quickly dispersed in a RIM constituent by my method to eliminate the need for supplemental chemical blowing agents.

Figure 2:
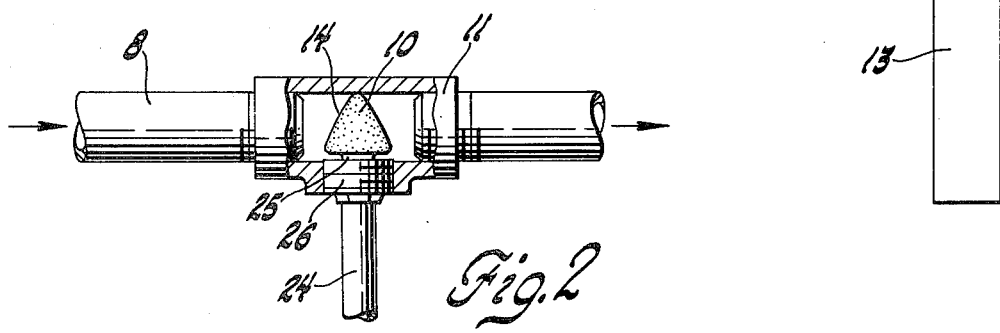

My invention will be more fully understood in reference to the drawing and detailed description which follow wherein:

FIG. 1 is a diagrammatic view of an apparatus suitable for the practice of my invention; and FIG. 2 is an enlarged detail of a portion of FIG. 1 showing a sectional view of a diffuser stone in place in the recirculation line.

In accordance with a preferred embodiment of the invention and referring to FIG. 1, a supply of a liquid polyether polyol 1 with a room temperature specific gravity of about 1.0 is delivered into a holding tank 2 through a conduit 3. The polyol 1 in the tank 2 is agitated with a blade mixer 4 operable at variable speeds by a suitable drive motor 5. Dry nitrogen gas is admitted into the space 6 above the polyol 1 through an inlet 7 at a pressure of about 5 psig, forming a gas blanket. A small portion of the polyol 1 is withdrawn from the tank 2 through a two-inch inside diameter pipe or line 8. The flow rate in the line 8 is controlled by a valve 9 located therein. As can be seen most clearly at FIG. 2, a microporous rigid diffuser stone 10 is inserted in a coupling 11 located in line 8 downstream from the tank outlet 12. The particular stone 10 employed for this embodiment was comprised of aluminum oxide particles bonded with a ceramic binder attached to a gas inlet tube 25. Such stones are rated according to the amount of air that can be diffused through the surface of a stone with a back pressure equivalent to two inches of water. I have found that a stone with a #2 rating, corresponding to 2 cubic feet of air per square foot of surface area passing through the stone per minute, produces bubbles of gas of a suitable size. Generally, the smaller the rating number, the smaller the size of the bubbles. Such stones are commercially available and may be adapted for use in my invention. Also useful for the practice of my invention is any suitably sized and shaped porous rigid structure through which a gas can be diffused at the surface in the form of minute bubbles. For example, such a structure could be fabricated from microporous steel, sandstone, or man-made composite materials.

The gas inlet tube 25 of the stone 10 was welded to the end of a gas tube 24 connected to a pressurized source of nitrogen gas 13. Tube 24 is fitted with a coupling means 26, forming a gas tight seal between itself and line coupling 11. The porous stone 10 is thereby sealably retained in the flow path of the polyol 1 in the line 8. The stone 10 may be positioned at any desired location in the line 8 and should be of the size that permits its surface 14 to be in contact with the constituent without completely blocking its flow. A gas flow meter 15 is positioned in the tube 24 between the nitrogen gas source 13 and the stone 10 to measure the amount of gas passing from source 13 to microporous stone 10 and into the polyol 1 in line 8. The flow of gas from the nitrogen 13 into the diffuser stone is regulated by a valve 16. The pressure in the nitrogen supply tank must be high enough so that gas bubbles can emanate from the surface 14 of stone 10 and polyol 1 in line 8 does not flow back through the stone 10 into the tube 24. A check valve (not shown) can be positioned in the tube 24 between the diffuser stone 10 and the flow meter 15 to failsafe the system.

When valve 16 from the nitrogen source 13 is opened, gas flows through tube 24 and flow meter 15 into diffuser stone 10 emanating from the surface 14 into the flowing polyol 1 in the form of minute bubbles. The polyol and entrained bubbles continue to flow through line 8 into a stationary blade-type mixer 17 where the bubbles are broken apart by collisions with the blades of the mixer into even smaller bubbles. The mixer 17 employed here was a Static Mixer ® manufactured by Kenics. The final size of the bubbles is a function of the number of blades in the mixer.

From mixer 17, the polyol 1 flows through a recirculation pump 18 into a heat exchanger 19. In polyurethane RIM systems, a heat exchanger is generally employed to maintain the polyol and isocyanate constituents at temperatures of about 25° to 35° C. prior to mixing. An outlet valve 20 to an injection mixing head (not shown) is provided downstream from the heat exchanger 19. The outlet valve 20 is closed except when a shot is delivered to the mixing head for molding a part. When the valve 20 is closed, the polyol 1 continues through line 8 back to holding tank 2 where it is released into the main portion of the polyol 1. The agitator 4 mixes the small portion containing the nitrogen gas into the polyol in the tank. The process is continued until a desired amount of nitrogen gas, corresponding to a predetermined reduced specific gravity of the polyol, is entrained.

To mold a part, outlet valve 20 is opened, and the aerated polyol is combined with the isocyanate precursor constituent by high pressure impingement mixing. When the constituents are pressurized for mixing, the entrained gas bubbles are substantially compressed. Hence, when the mixed liquids are delivered into the mold and the pressure is relieved, the bubbles rapidly expand causing the mixture to foam and fill out the mold. The polyol and isocyanate constituents cross-link and cure around the bubbles, forming a thermoset polyurethane article with a microcellular structure and a good paintable surface.

In a polyurethane system, the procedure disclosed for entraining a gas in the polyol constituent may be duplicated for the isocyanate constituent to increase the cellularity of a molded article. Unlike prior art methods, enough gas bubbles can be entrained in the constituents of a polyurethane system by my invention to totally eliminate the need for Freon ® or some other chemical blowing agent.

For example, thermoset, microcellular polyurethane automobile fascia weighing about 6.5 pounds each were molded with the above described polyol gas entraining apparatus and a duplicate apparatus for the isocyanate constituent. The chemical constituents were purchased from a commercial supplier and contained no heat activated blowing agents. The polyol constituent comprised a mixture of polyether and butane diol, the mixture having an average equivalent weight per hydroxyl group of about 300 and a specific gravity of about 1.0. The isocyanate constituent was diphenyl methane diisocyanate and had a specific gravity of about 1.2. The chemicals were highly catalyzed to accelerate cure rates. 75 gallons of each constituent was pumped into a holding tank and nitrogen gas was entrained according to may invention as described above. With a pressure of 50 psi at the nitrogen tank outlet valves and a recirculation pressure of about 45 psi in the two-inch recirculation lines, enough nitrogen gas was entrained in each constituent to mold a part in about 15 minutes. The specific gravity of the polyol was reduced from about 1.0 to about 0.8 and the specific gravity of the isocyanate from about 1.2 to 1.0. The temperature of the polyol and isocyanate constituents were maintained at about 80° F. and 90° F. respectively, by the heat exchangers.

A part was molded by impingement mixing 100 parts by volume polyol and 90 parts by volume isocyanate at respective pressures of about 2000 and 1500 psi, and injecting the mixture into a heated mold. The cured part had a specific gravity of about 0.9, good cell structure and a smooth paintable surface. Hence, a material savings of about 20%, over a pound per part, was achieved without the use of Freon or any other heat activated blowing agent. Even more remarkable, is that molding cycle times of about 30 seconds were achieved with the practice of my invention where cycle times of 90 seconds or more are needed when heat activated blowing agents are used. Much longer in-mold times are required for chemically blown systems since the material must be heated in the mold to activate the blowing agent and less catalyst can be used or a part will set up before it is blown. Other polyurethane systems based on different polyols and isocyanate constituents have been foamed by my method with equal success.

As would be obvious to those skilled in the art, the amount of time taken to entrain a desired quantity of a gaseous blowing agent into a RIM constituent can be controlled making ordinary adjustments to a suitable apparatus. For example, if hundreds of gallons of a RIM constituent were to be foamed in the described apparatus, larger diffusion stones and recirculation lines could be employed to entrain the blowing agent in a matter of minutes.

Referring again to FIG. 1, means are also shown for automatically controlling the entrainment of a predetermined amount of a gaseous blowing agent into a liquid chemical constituent of a RIM system. Since the specific gravity of such constituents is characteristically lowered in accordance with the concentration of gas entrained therein, the specific gravity can be continually monitored to check whether more gas should be diffused though the rigid microporous structure into the constituent. More particularly, a sample of the polyol 1 is continually withdrawn from agitated tank 2 by means of a pump 21 into a specific gravity measuring instrument 22 such as a Dynatrol ®. The measured specific gravity is checked against a predetermined desired final specific gravity corresponding to a specified predetermined amount of gaseous blowing agent entrained in the constituent. So long as the measured specific gravity exceeds the desired value, a controller 23 operates to keep regulator valve 16 on nitrogen tank 13 in open position, allowing gas to diffuse through the stone 10 into the flowing polyol 1. When the measured specific gravity equals or is less than the desired specific gravity, regulator valve 16 is closed by controller 23 and entrainment of gas bubbles in the constituent is stopped. The control means may be continuously operated to achieve and maintain desired levels of gaseous blowing agent in the polyol 1 constituent.

While my invention has been disclosed in terms of specific embodiments thereof, it will be appreciated that other forms could readily be adapted by one skilled in the art. Accordingly, the scope of my invention is to be limited only by the following claims.

What is claimed is:

1. A method of rapidly entraining a predetermined quantity of a gas into a liquid constituent which is intended subsequently to be mixed with a second constituent reactive therewith to form a cellular polyurethane body, said method comprising the steps of containing said liquid constituent in a stirred vessel, said vessel being equipped with a recirculation line leading away from and returning to said vessel, withdrawing a relatively small portion of said liquid constituent from said vessel through said line, entraining minute bubbles of a gas in said portion of said liquid constituent, said bubbles emanating from a rigid microporous structure positioned in the line and in the path of the flowing constituent, returning said portion of said liquid constituent containing the entrained bubbles through said line to said stirred vessel, repeating said withdrawing, entraining and returning steps until a desired amount of said gas is entrained in the liquid constituent.

2. In the practice of dispersing a predetermined quantity of a gaseous agent in a known quantity of liquid precursor material contained in a stirred vessel preparatory to said precursor material being mixed with another precursor material and the mixture then being injected into a mold wherein it reacts to form an injection molded cellular polyurethane article, the improved method comprising continuously withdrawing from the vessel a relatively small portion of said liquid material in a continuous flowing stream, introducing a said gas into said portion of said liquid material in the form of minute entrained bubbles, and returning the gas containing liquid portion to the main body of the liquid in the stirred vessel, the introduction of said gas into said flowing stream being continued until the quantity of gas in the liquid in said vessel reaches a desired predetermined quantity suitable for the production of said articles.

3. A method of rapidly entraining a predetermined quantity of a gaseous blowing agent in a liquid constituent which is intended subsequently to be mixed with a second constituent reactive therewith to form a cellular polyurethane body, said method comprising the steps of containing said liquid constituent in a stirred vessel, said vessel being equipped with a recirculation line leading away from and returning to said vessel, withdrawing a relatively small portion of said liquid constituent from said vessel through said line, entraining minute bubbles of a gas in said portion of said liquid constituent, said bubbles emanating from a rigid microporous structure positioned in the line to contact the liquid constituent flowing therethrough, dividing the bubbles entrained in the liquid constituent into smaller bubbles, returning said portion of said liquid constituent containing the entrained bubbles through said line to said stirred vessel, repeating said withdrawing, entraining, dividing, and returning steps until a desired amount of said gas is entrained in the constituent.

4. In the practice of dispersing a gaseous blowing agent in a quantity of liquid precursor material contained in a stirred vessel preparatory to said liquid precursor material being employed in the production of reaction injection molded polyurethane articles, the improved method comprising continuously withdrawing from the vessel a relatively small portion of said liquid material in a continuous flowing stream, introducing a said gaseous agent into said portion of said liquid material in the form of minute uniformly dispersed bubbles, returning the gas containing portion to the main body of the liquid material in the stirred vessel, and measuring the specific gravity of the gas containing liquid in the stirred vessel and continuing the introduction of the gas into said flowing stream until a desired specific gravity corresponding to a predetermined concentration of gaseous blowing agent entrained in the liquid constituent is reached.

* * * * *